Dec. 31, 1963     L. J. LOGAN     3,115,964
MATERIAL HANDLING APPARATUS
Filed Aug. 18, 1961
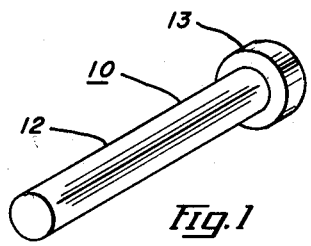
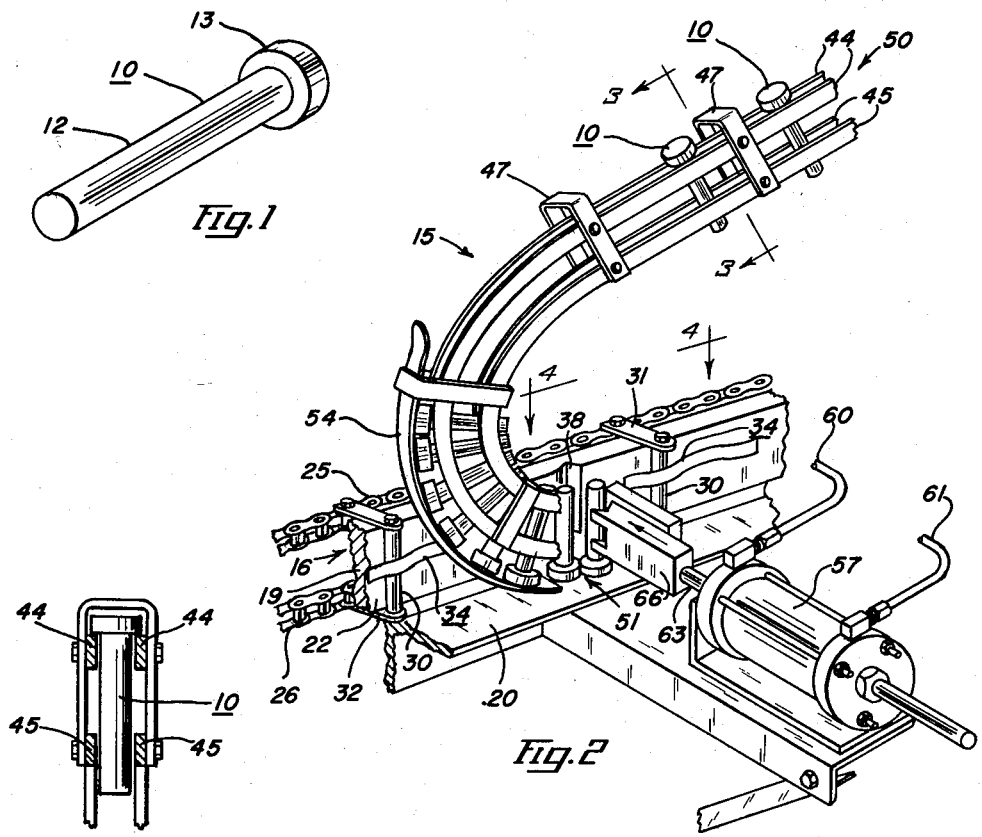
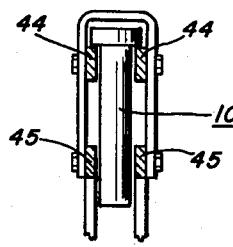
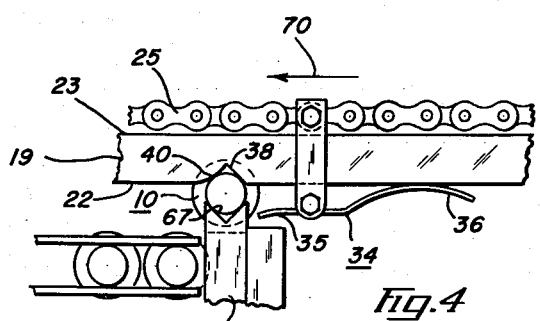
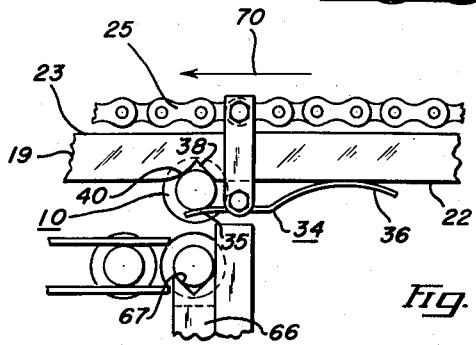
INVENTOR.
LEWIS J. LOGAN United States Patent Office 3,115,964
Patented Dec. 31, 1963

3,115,964
MATERIAL HANDLING APPARATUS
Lewis J. Logan, 11820 Edgewater Drive, Lakewood, Ohio
Filed Aug. 18, 1961, Ser. No. 132,450
7 Claims. (Cl. 198—24)

The present invention relates in general to material handling apparatus and more particularly to such apparatus for reversing the position of members and feeding them onto a conveyor mechanism.

An object of the invention is to provide a material handling apparatus which is capable of handling headed members and generally reversing the position of the same with respect to the vertical axis of the headed member.

Another object of the present invention is to provide a guideway which extends through an arc on the order of 180 degrees and which lies generally in a vertical plane whereby the vertical position of members traveling through the guideway is changed.

Another object of the present invention is to provide a novel means of transferring members from the exit portion of a guideway onto a conveyor mechanism.

Another object of the present invention is to provide a novel conveyor system for transporting members to various stations where work is performed thereon.

Another object of the present invention is to provide a novel holding mechanism which secures a member in position while being transported between various work stations.

Other objects and a fuller understanding of this invention may be had by referring to the following description and claims, taken in conjunction with the accompanying drawings, in which:

FIGURE 1 is an isometric view of a member which can be handled by the apparatus of the present invention;

FIGURE 2 is an isometric view of the material handling apparatus of the present invention;

FIGURE 3 is a view taken generally along the line 3—3 of FIGURE 2;

FIGURE 4 is a view taken generally along the line 4—4 of FIGURE 2; and

FIGURE 5 is a view similar to FIGURE 4 but showing some of the elements of the construction in a different position from that shown in FIGURE 4.

The material handling apparatus of the present invention will be susceptible of a wide range of use as will be appreciated by those skilled in the art, however, as a specific embodiment the apparatus will be described as handling large headed members 10 which are transported along a conveyor to various stations where work is performed thereon to transform the members 10 into welding studs. A large headed member 10 which is handled by the apparatus is best seen in FIGURE 1 and includes a body portion 12 and an enlarged head 13. The apparatus for handling these members is best seen in FIGURE 2 and includes generally the combination of a turnover or reversing mechanism 15 and a conveyor mechanism 16. The conveyor mechanism comprises a vertically disposed mounting member 19 which is secured in fixed position and mounted by a frame 20. The mounting member 19 has front and rear side walls 22 and 23 respectively and a chain member having upper and lower run portions 25 and 26 respectively moveable along or adjacent the upper and lower portions of the rear side wall 23 is provided. The chain is adapted to be mounted and caused to move in the manner above described, by a mechanism which is conventional and as a result no detail has been gone into in describing this mechanism.

A holding mechanism is carried along the front side wall of the mounting member 19 and includes in general a vertical pivot member 30 and the pivot member 30 is secured in position by means of first and second mounting plates 31 and 32 respectively. The first and second mounting plates 31 and 32 are secured respectively at one end thereof to the upper and lower run portions 25 and 26 of the chain and then extend across the upper and lower edges or ends of the mounting member 19 and are secured respectively at their other ends to opposed ends of the pivot member 30. In this manner the pivot member is caused to move along the front face or side wall of the mounting member 19 for a purpose which will become apparent from the discussion given hereinafter. A holding member 34 is secured to the pivot member 30 and is provided with first and second end portions 35 and 36 respectively. The first or forward end portion of the holding member is spaced from the front side wall of the mounting member (FIGURES 4 and 5) and this is particularly true when the second or rearward portion of the holding member is in engagement with the front side wall of the mounting member.

Wall means 38 define what may generally be referred to as a V-shaped pick-up notch in the front side wall of the mounting member. It will be noted that the forward portion of the pick-up notch is rounded off as at 40 to facilitate removal of a member held therein as the chain travels through its movement.

The members 10 are transported to the V-shaped pick-up notch 38 by the turnover or reversing mechanism 15. This mechanism comprises a guideway which includes first and second pairs of spaced support members 44 and 45 respectively which are held in position relative to each other by U-shaped brackets 47. It will be noted that the guideway which includes the spaced support members extends in or through an arc which generally traverses 180 degrees from an entrance portion 50 to an exit portion 51. The support members 44 of the first pair as will be noted in FIGURES 2 and 3 serve to engage the underside of the enlarged head 13 of the member. In this manner the large headed members are caused to travel through the first portion of the arc above referred to. A restraining member 54 is connected to the guideway and extends from what may be referred to as the vertical portion of the arc through the lower horizontal portion of the arc to the exit portion. The purpose of the restraining member 54 which is included within the guideway is to prevent the large headed members from falling from the guideway as it is constructed herein. As the large headed members pass on further towards the exit portion of the guideway, the restraining member serves more and more as a support for the large headed members. Located adjacent the exit portion 51 of the guideway and mounted on the frame 20 is an air cylinder 57, and mounted within the air cylinder is a conventional piston which has not been shown herein. Air is introduced into the cylinder on opposite sides of the piston by means of conduits 60 and 61. Connected to the piston which is not shown, and extending from the cylinder is a piston rod 63 to which is connected an engaging member 66. Wall means 67 are formed on the end of the engaging member and are provided thereon so that a large headed member at the exit portion of the guideway can be conveniently engaged and moved into the V-shaped engaging notch 38.

In operation the large headed members are introduced into the entrance portion 50 of the reversing mechanism 15 from which position they travel to the exit portion thereof in a manner which will be readily understood from reviewing the drawings. At a predetermined signal, air is introduced through conduit 61 which causes movement of the piston within the air cylinder and engagement of a large headed member 10 by the V-shaped wall means 67 which in turn causes the large headed member to be received in the V-shaped receiving notch 38. The chain member in its travel indicated by arrow 70 in FIGURE 4 causes the forward end portion 35 of the holding member 34 to pick up the body portion 12 of the large headed member as seen in FIGURE 5 and withdrawal of the engaging member 66 and further travel of the chain causes the large headed member to be moved along the front side wall 22 of the mounting member 19. Removal of the engaging member 66 is caused by air under pressure being introduced through conduit 60 and removal of air under pressure from the other side of the piston. The large headed member is transported as mentioned hereinabove to another station where work is performed thereon and upon movement of the holding member 34 past the V-shaped pick-up notch 38 another large headed member is moved into the V-shaped pick-up notch in the same manner and positioned to be picked up by another holding member 34 which is of the same construction as hereinabove described.

In this manner it will therefore be recognized that material handling apparatus of the present invention provides a convenient means for receiving members and particularly large headed members, reversing their vertical position and feeding them onto a conveyor which thereafter transports them to various work stations. The holding mechanism which is utilized to secure the members in position while they are being transported as well as the conveyor system and means for transferring the members from the guideway to the conveyor mechanism, all serve to provide an efficient and reliable material handling apparatus.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for reversing the position of a large headed member and transporting it along a generally horizontal path of travel including in combination a turnover mechanism and a conveyor mechanism, said conveyor mechanism comprising a vertical mounting member having front and rear sidewalls, a chain member having upper and lower run portions movable along said rear sidewall of said vertical mounting member, a holding mechanism including a vertical pivot member located adjacent said front sidewall of said mounting member, first and second mounting plates secured respectively at one end to said upper and lower run portions and extending across the upper and lower ends of said mounting member and secured respectively at their other ends to opposite ends of said pivot member, a holding member secured to said pivot member and extending lengthwise of said mounting member and having a forward portion spaced from said mounting member when a rearward portion is in engagement with said mounting member, wall means defining a generally V-shaped pick-up notch in said front sidewall of said mounting member, said turnover mechanism comprising first and second pairs of spaced support members extending through an arc of substantially 180 degrees, a restraining member secured to and spaced from said support members and extending through the vertical and lower horizontal portion of said arc, said turnover mechanism having an exit portion adjacent said V-shaped pick-up notch, an air cylinder located adjacent said exit portion, a piston in said cylinder and having an engaging member connected thereto with V-shaped wall means for engagement with a large headed member to move it into said V-shaped pick-up notch.

2. Apparatus for reversing the position of a large headed member and transporting it along a generally horizontal path of travel including in combination a turnover mechanism and a conveyor mechanism, said conveyor mechanism comprising a mounting member having front and rear sidewalls, a chain member having upper and lower run portions movable along said mounting member, a holding mechanism including a pivot member located adjacent said mounting member, first and second mounting plates secured respectively at one end to said upper and lower run portions and secured respectively at their other ends to opposite ends of said pivot member, a holding member secured to said pivot member and having a forward portion spaced from said mounting member when a rearward portion is in engagement with said mounting member, wall means defining a pick-up notch in said mounting member, said turnover mechanism comprising support members extending through an arc of substantially 180 degrees, a restraining member secured to and spaced from said support members and extending through the vertical and lower horizontal portion of said arc, said turnover mechanism having an exit portion adjacent said pick-up notch, cylinder means located adjacent said exit portion, piston means in said cylinder means and having an engaging member connected thereto with wall means for engagement with a large headed member to move it into said pick-up notch.

3. Apparatus for reversing the position of a member and transporting it along a path of travel including in combination a turnover mechanism and a conveyor mechanism, said conveyor mechanism comprising a mounting member, a chain member having upper and lower run portions movable along said mounting member, a holding mechanism including a vertical pivot member located adjacent said mounting member, first and second mounting plates secured respectively at one end to said upper and lower run portions and secured respectively at their other ends to opposite ends of said pivot member, a holding member secured to said pivot member and having a forward portion spaced from said mounting member when a rearward portion is in engagement with said mounting member, wall means in said mounting member defining a pickup position, said turnover mechanism comprising support members extending through an arc which lies substantially in a vertical plane, a restraining member spaced from said support members and extending through the vertical and lower horizontal portion of said arc, said turnover mechanism having an exit portion adjacent said pickup position and power means supporting an engaging member having wall means for engagement with a member to move it into said pickup position.

4. Apparatus for handling a member including in combination a conveyor mechanism comprising a mounting member, a chain member movable along said mounting member, a holding member secured to said chain and having a forward portion spaced from said mounting member, wall means defining a pickup position, said pickup position being located in the path of movement of said holding member, a guideway extending through an arc and having an exit portion adjacent said pickup position, and means adjacent said exit portion for moving the members into said pickup position when they leave said guideway.

5. A conveyor mechanism comprising a vertical mounting member having front and rear sidewalls, a chain member having upper and lower run portions movable along said rear sidewall of said vertical mounting member, a holding mechanism including a vertical pivot member located adjacent said front sidewall of said mounting member, first and second mounting plates secured respectively at one end to said upper and lower run portions and extending across the upper and lower ends of said mounting member and secured respectively at their other ends to opposite ends of said pivot member, a holding member secured to said pivot member and extending lengthwise of said mounting member and having a forward portion spaced from said mounting member when a rearward portion is in engagement with said mounting member, and wall means defining a generally V-shaped pickup notch in said front sidewall of said mounting member.

6. A conveyor mechanism comprising a mounting member having front and rear sidewalls, a chain member having upper and lower run portions movable along said rear sidewall of said mounting member, a holding mechanism including a pivot member located adjacent said front sidewall of said mounting member, first and second mounting plates secured respectively at one end to said upper and lower run portions and at their other ends to opposite ends of said pivot member, a holding secured to said pivot member and extending lengthwise of said mounting member and having a forward portion spaced from said mounting member when a rearward portion is in engagement with said mounting member, and wall means defining a pickup notch in said front sidewall of said mounting member.

7. A conveyor mechanism comprising a mounting member, a chain member having upper and lower run portions movable along said mounting member, a holding mechanism including a pivot member located adjacent said mounting member, means connecting the respective ends of said pivot member to said upper and lower run portions of said chain member, a holding member secured to said pivot member and extending lengthwise of said mounting member and having a forward portion spaced from said mounting member and having a rearward portion adapted to engage said mounting member.

References Cited in the file of this patent

UNITED STATES PATENTS

| | | |
|---|---|---|
| 1,290,888 | Bracey | Jan. 14, 1919 |
| 2,950,671 | Allen | Aug. 30, 1960 |